United States Patent
Chiba

(10) Patent No.: US 9,401,772 B2
(45) Date of Patent: Jul. 26, 2016

(54) COMMUNICATION SYSTEM, CONTROL DEVICE, FORWARDING NODE, COMMUNICATION CONTROL METHOD, AND PROGRAM

(75) Inventor: Yasunobu Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 13/982,239

(22) PCT Filed: Sep. 26, 2011

(86) PCT No.: PCT/JP2011/005385
§ 371 (c)(1),
(2), (4) Date: Jul. 26, 2013

(87) PCT Pub. No.: WO2012/101690
PCT Pub. Date: Aug. 2, 2012

(65) Prior Publication Data
US 2013/0301658 A1 Nov. 14, 2013

(30) Foreign Application Priority Data
Jan. 28, 2011 (JP) .................. 2011-016322

(51) Int. Cl.
*H04J 3/06* (2006.01)
*H04L 12/935* (2013.01)
(52) U.S. Cl.
CPC ........... *H04J 3/0658* (2013.01); *H04L 49/3009* (2013.01)
(58) Field of Classification Search
CPC .................... H04J 3/0658; H04L 49/3009
USPC ........................................... 370/503
See application file for complete search history.

(56) References Cited

U.S. PATENT DOCUMENTS

| 5,765,172 A | 6/1998 | Fox | |
|---|---|---|---|
| 8,260,742 B2 * | 9/2012 | Cognigni et al. | 707/620 |
| 2009/0052445 A1 * | 2/2009 | Folkes | 370/389 |
| 2015/0016477 A1 * | 1/2015 | Ogawa | 370/503 |

FOREIGN PATENT DOCUMENTS

| JP | 2002-158695 A | 5/2002 |
|---|---|---|
| JP | 2009-510566 A | 3/2009 |
| WO | WO 2008/095010 A1 | 8/2008 |

OTHER PUBLICATIONS

International Search Report dated Nov. 22, 2011 in PCT/JP2011/005385, with English translation thereof.

(Continued)

*Primary Examiner* — Melvin Marcelo
(74) *Attorney, Agent, or Firm* — McGinn IP Law Group

(57) ABSTRACT

A communication system includes a control device that determines packet processing rules; a forwarding node that processes a received packet using a processing rule that includes one of a plurality of processing rules transmitted from the control device and that corresponds to the received packet; a comparison unit that compares a first value with a second value wherein the first value is calculated from a first processing rule group held in the forwarding node and the second value is calculated from a second processing rule group determined by the control device for transmission to the forwarding node; and a confirmation unit that confirms if the forwarding node and the control device are synchronized based on the comparison result.

17 Claims, 18 Drawing Sheets

(56) References Cited

OTHER PUBLICATIONS

Nick McKeown and seven other authors, "OpenFlow: Enabling Innovation in Campus Networks", [online], [Searched on Dec. 22, 2010], Internet <URL: http://www.openflowswitch.org//documents/openflow-wp-latest.pdf>.

"Openflow Switch Specification" Version 1.0.0. (Wire Protocol 0x01) [Searched on Dec. 22, 2010], Internet <URL: http://www.openflowswitch.org/documents/openflow-spec-v1.0.0.pdf>.

Chinese Office Action dated Feb. 25, 2015 with an English translation thereof.

Junfeng Xing, et al.,: "Application of Hash Table to Design Address Table in Switch Controller," Computer Engineering, Oct. 5, 2005, vol. 31, No. 19, http://www.cnki.net.

Internet Innovator OpenFlow Forum, "China Education Network", No. 12, Dec. 5, 2008, line 12 in col. 2-line 23 in col. 3 on p. 27, and Figs 2-4.

Japanese Office Action dated Aug. 18, 2015 with English translation.

* cited by examiner

FIRST VALUE (SECOND VALUE) = HASH(h1,h2,h3, ... ,hx)

Fig. 5

| Priority | Matching Rule | Actions | Partition # |
|---|---|---|---|
| 65535 | A | Output to Port #9 | 1 |
| : | : | : | : |
| 2048 | B | Output to Port #7 | 2 |
| : | : | : | : |
| 32 | X | Output to Port #2 | 3 |
| : | : | : | : |

Fig. 6

| Htable | Hp1 | Hp2 | Hp3 | ·· | Hpx |
|--------|--------|--------|--------|----|--------|
| 0x1a86 | 0x1abf | 0xa87f | 0x29ca | ·· | 0xa9ba |

Fig. 7

| DPID | Priority | Matching Rule | Actions | Partition # |
|---|---|---|---|---|
| 1 | 65535 | A | Output to Port #9 | 1 |
| 2 | 65535 | A | Output to Port #6 | 3 |
| 3 | 65535 | A | Output to Port #1 | 2 |
| 1 | 4096 | B | Output to Port # 7 | 2 |
| 2 | 2048 | B | Output to Port #4 | 3 |
| 3 | 4096 | B | Output to Port #3 | 5 |
| 1 | 32 | X | Output to Port #2 | 1 |
| 2 | 32 | X | Output to Port #5 | 1 |

Fig. 8

| Htable | Hp1 | Hp2 | Hp3 | ... | Hpx | CHANGE CONTENT |
|---|---|---|---|---|---|---|
| 0x1a86 | 0x1abf | 0xa87f | 0x29ca | ... | 0xa9ba | INITIAL STATE |
| 0x1ba4 | 0xab23 | 0xa87f | 0x29ca | ... | 0xa9ba | ADD PROCESSING RULE FOR MATCHING RULE A TO FORWARDING NODE WITH DPID#1 (POSITION: PARTITION #1) |
| 0x1a86 | 0x1abf | 0xa87f | 0x29ca | ... | 0xa9ba | DELETE PROCESSING RULE FOR MATCHING RULE A FROM FORWARDING NODE WITH DPID#1 BECAUSE OF TIMEOUT (POSITION: PARTITION #1) |
| 0x5187 | 0x1abf | 0x1876 | 0x29ca | ... | 0xa9ba | ADD PROCESSING RULE FOR MATCHING RULE B TO FORWARDING NODE WITH DPID#1 (POSITION: PARTITION #2) |
| 0x1a86 | 0x1abf | 0xa87f | 0x29ca | ... | 0xa9ba | DELETE PROCESSING RULE FOR MATCHING RULE B FROM FORWARDING NODE WITH DPID#1 BECAUSE OF TIMEOUT (POSITION: PARTITION #2) |

Fig. 14

| Ct | St | Htable | Hp1 | Hp2 | Hp3 | .. | Hpx |
|----|----|--------|------|------|------|----|------|
| 2 | 2 | 0x1a86 | 0x1abf | 0xa87f | 0x29ca | .. | 0xa9ba |

Fig. 15

| Ct | St | Htable | Hp1 | Hp2 | Hp3 | ... | Hpx | CHANGE CONTENT |
|---|---|---|---|---|---|---|---|---|
| 0 | 0 | 0x1a86 | 0x1abf | 0xa87f | 0x29ca | ... | 0xa9ba | INITIAL STATE |
| 1 | 0 | 0x1ba4 | 0xab23 | 0xa87f | 0x29ca | ... | 0xa9ba | ADD PROCESSING RULE FOR MATCHING RULE A TO FORWARDING NODE WITH DPID#1 (POSITION: PARTITION #1) |
| 1 | 1 | 0x1a86 | 0x1abf | 0xa87f | 0x29ca | ... | 0xa9ba | DELETE PROCESSING RULE FOR MATCHING RULE A FROM FORWARDING NODE WITH DPID#1 BECAUSE OF TIMEOUT (POSITION: PARTITION #1) |
| 2 | 1 | 0x5197 | 0x1abf | 0x1676 | 0x29ca | ... | 0xa9ba | ADD PROCESSING RULE FOR MATCHING RULE B TO FORWARDING NODE WITH DPID#1 (POSITION: PARTITION #2) |
| 2 | 2 | 0x1a86 | 0x1abf | 0xa87f | 0x29ca | ... | 0xa9ba | DELETE PROCESSING RULE FOR MATCHING RULE B FROM FORWARDING NODE WITH DPID#1 BECAUSE OF TIMEOUT (POSITION: PARTITION #2) |

Fig. 16

| Ct | St | Htable | Hp1 | Hp2 | Hp3 | ... | Hpx | CHANGE CONTENT |
|---|---|---|---|---|---|---|---|---|
| 0 | 0 | 0x1a86 | 0x1abf | 0xa87f | 0x29ca | ... | 0xa9ba | INITIAL STATE |
| 1 | 0 | 0x1ba4 | 0xab23 | 0xa87f | 0x29ca | ... | 0xa9ba | ADD PROCESSING RULE FOR MATCHING RULE A TO FORWARDING NODE WITH DPID#1 (POSITION: PARTITION #1) |
| 1 | 1 | 0x1a86 | 0x1abf | 0xa87f | 0x29ca | ... | 0xa9ba | DELETE PROCESSING RULE FOR MATCHING RULE A FROM FORWARDING NODE WITH DPID#1 BECAUSE OF TIMEOUT (POSITION: PARTITION #1) |
| 2 | 1 | 0x5187 | 0x1abf | 0x1876 | 0x29ca | ... | 0xa9ba | ADD PROCESSING RULE FOR MATCHING RULE B TO FORWARDING NODE WITH DPID#1 (POSITION: PARTITION #2) |

PROCESSING RULE IS CREATED AND SET AFTER SYNCHRONIZATION CONFIRMATION INFORMATION REQUEST IS ISSUED

COMPARE

| Ct | St | Htable | Hp1 | Hp2 | Hp3 | .. | Hpx |
|---|---|---|---|---|---|---|---|
| 1 | 1 | 0x1a86 | 0x1abf | 0xa87f | 0x29ca | .. | 0xa9ba |

COMMUNICATION SYSTEM, CONTROL DEVICE, FORWARDING NODE, COMMUNICATION CONTROL METHOD, AND PROGRAM

TECHNICAL FIELD

CROSS-REFERENCE TO RELATED APPLICATIONS

The present invention claims priority from Japanese Patent Application 2011-016322 (filed on Jan. 28, 2011) the content of which is hereby incorporated in its entirety by reference into this specification.

The present invention relates to a communication system, a control device, a forwarding node, a communication control method, and a program and more particularly to a communication system having a control device for integrally controlling forwarding node(s) arranged in a network, a control device, a forwarding node, a communication control method, and a program.

BACKGROUND

In a communication system where a control device integrally controls forwarding node(s) for carrying out communication, the forwarding node(s) and the control device must be synchronized with each other. This is because, if the control device and the forwarding node(s) are not synchronized, a packet-forwarding method instruction transmitted from the control device to a forwarding node becomes inconsistent with the packet forwarding processing performed by the forwarding node, with the result that the packet forwarding not intended by the control device is performed.

As a communication system where the control device integrally controls the forwarding node(s) as described above, the technology called OpenFlow is known (see Patent Literature 1 and Non-Patent Literatures 1 and 2). OpenFlow identifies communications as end-to-end flows and performs path control, failure recovery, load balancing, and optimization on a per-flow basis. An OpenFlow switch, which is specified in Non-Patent Literature 2, has a secure channel for communication with an OpenFlow controller that serves as a control device, and operates according to the flow table to which information is added, and whose contents are rewritten, according to an instruction from the OpenFlow controller as necessary. In the flow table, a set of the following three is defined for each flow: a matching rule (Header Fields) against which a packet header is matched, flow statistical information (Counters), and an action(s) (Actions) that defines processing contents (see FIG. 18).

For example, when a packet is received, the OpenFlow switch searches the flow table for an entry that has a matching rule (see Header fields in FIG. 18) that matches the header information of the received packet. If an entry matching the received packet is found as a result of the search, the OpenFlow switch updates the flow statistical information (Counters) and, at the same time, performs the processing contents (packet transmission from a specified port, flooding, drop, etc.), described in the Actions field of the entry, for the received packet. On the other hand, if an entry matching the received packet is not found as a result of the search, the OpenFlow switch forwards the received packet to the OpenFlow controller via the secure channel, requests the OpenFlow controller to determine a packet path based on the transmission source/destination of the received packet, receives a flow entry for the packet path, and updates the flow table. In this way, the OpenFlow switch forwards a packet using an entry, stored in the flow table, as the processing rule.

However, Patent Literature 1 and Non-Patent Literatures 1 and 2 described above do not include a practical study on how to confirm the synchronization between the OpenFlow controller and the OpenFlow switch.

In addition, Patent Literature 2 discloses the technology for confirming if data held in a mobile device and data stored in the database to which the mobile device is connected are synchronized. According to this literature, a mobile device generates a hash for each piece of data held in the mobile device and transmits the generated hash to the synchronization server to request it to confirm if the data is synchronized. The synchronization server generates a hash for each piece of data for which synchronization confirmation is requested. The synchronization server compares a plurality of hashes, transmitted from the mobile device, with a plurality of hashes generated by the synchronization server. The synchronization server confirms data synchronization based on the comparison result. The literature describes that the bandwidth required for synchronization may be reduced by generating a hash from each of multiple data pieces, for which synchronization confirmation is required, and by performing synchronization confirmation.

CITATION LIST

Patent Literature (PTL)

[PTL 1]
International Publication No. WO2008/095010A1
[PTL 2]
JP Patent Kohyo Publication No. JP-P2009-510566A

Non Patent Literature (NPL)

[NPL 1]
Nick McKeown and seven other authors, "OpenFlow: Enabling Innovation in Campus Networks", [online], [Searched on Dec. 22, 2010], Internet <URL: http://vvww.openflowswitch.org//documents/openflow-wp-latest.pdf>
[NPL 2]
"Openflow Switch Specification" Version 1.0.0. (Wire Protocol 0x01) [Searched on Dec. 22, 2010], Internet <URL: http://www.openflowswitch.org/documents/openflow-spec-v1.0.0.pdf>

SUMMARY

The following analysis is given by the present invention. As described above, Patent Literature 1 and non-Patent Literatures 1 and 2 describe a technology that only provides control messages, called Stats Request/Reply, for retrieving the contents of flow tables, or used to transmit the contents of flow entries as a response (see "5.3.5 Read State Messages" in Non-Patent Literature 2) but not a method for efficiently confirming synchronization between a forwarding node and the control device.

The technology disclosed in Patent Literature 2 compares the hash values each of which represents a database (database hashes) and, if a mismatch is detected as a result of the comparison, generates the hash per each of data pieces held in a mobile device and confirms synchronization (compares record hashes). That is, for the purpose of synchronization confirmation, multiple hashes each corresponding to each piece of data for which synchronization is requested are exchanged over the network. Therefore, network traffic is generated for synchronization confirmation for each of multiple data pieces stored in the database.

In a communication system where a control device integrally controls forwarding nodes, synchronization confirmation, if performed by the method such as Stats Request/Reply disclosed in Non-Patent Literature 2 or by the method disclosed in Patent Literature 2, will bring about a problem that the load of the control device or the forwarding nodes will increase. In addition, it should be taken into consideration that an increase in the number of forwarding nodes to be controlled or an increase in the number of processing rules (subdivision of control granularity) per user will result in an exponential increase in the load of the control device. In particular, the method described in Patent Literature 2 generates network traffic for confirming the synchronization of each piece of data and, therefore, the synchronization confirmation traffic is increased and the load of the control device is further increased.

It is an object of the present invention to provide an efficient method for confirming synchronization between a forwarding node and the control device in a communication system where the control device integrally controls the forwarding nodes for communication.

According to a first aspect, there is provided a communication system, comprising: a control device that determines packet processing rules; at least one forwarding node that processes a received packet using a processing rule that is one of a plurality of processing rules transmitted from the control device and that corresponds to the received packet; and a comparison unit that compares a first value with a second value. The first value is calculated from a first processing rule group held in the forwarding node, and the second value is calculated from a second processing rule group determined by the control device for transmission to the forwarding node. The communication system further comprises a confirmation unit that confirms if the forwarding node and the control device are synchronized based on the comparison result.

According to a second aspect, there is provided a control device comprising: means (a unit) that determines packet processing rules; and means (a unit) that transmits the determined processing rule to a forwarding node that processes a received packet according to a processing rule that is one of a plurality of processing rules and that corresponds to the received packet. The control device further comprises means (a unit) that calculates a second value from a second processing rule group determined for transmission to the forwarding node in order to confirm synchronization with the forwarding node by comparison with a first value calculated from a first processing rule group held in the forwarding node.

According to a third aspect, there is provided a forwarding node comprising: means (a unit) that processes a received packet according to a processing rule that is one of a plurality of processing rules transmitted from a control device and that corresponds to the received packet; and means (a unit) that calculates a first value from a first processing rule group held in the forwarding node itself in order to confirm synchronization between the control device and the forwarding node by comparison with a second value calculated from a second processing rule group determined by the control device for transmission to the forwarding node.

According to a fourth aspect, there is provided a communication control method that controls a communication system comprising: a control device that determines packet processing rules; and at least one forwarding node that processes a received packet using a processing rule that is one of a plurality of processing rules transmitted from the control device and that corresponds to the received packet. The communication control method comprises the steps of: comparing a first value with a second value, the first value calculated from a first processing rule group held in the forwarding node, the second value calculated from a second processing rule group determined by the control device for transmission to the forwarding node; and confirming if the forwarding node and the control device are synchronized based on the comparison result. This method is linked to a forwarding node(s) and to a special machine called a control device that integrally controls forwarding nodes.

According to a fifth aspect, there is provided a program causing a computer, installed on a forwarding node that performs packet processing according to a processing rule that is set by a control device, to execute processing of adding matching information to a received packet, the matching information representing information on processing for the received packet; and processing of confirming if the forwarding node and the control device are synchronized according to whether the matching information added to the received packet matches pre-calculated matching information. This program may be recorded on (or embodied in) a computer-readable storage medium which may be non-transient. That is, the present invention may be implemented as a computer program product.

The program may perform (or assume) the physical and electronical, in general technical function(s) to be performed by the forwarding node, controlling device, and/or communication system, at least partly thereof.

The meritorious effects of the present invention are summarized as follows.

The present disclosure allows synchronization confirmation to be performed efficiently between a forwarding node and a control device in a communication system where the control device integrally (or uniformly) controls the forwarding nodes for carrying out communication.

The computer program processes physical and electrical data which represent technical parameters, i.e., bearing technical characters. The computer (and the program, too) itself is implemented as part of the communication system, control device and/or forwarding node(s), which constitutes (and qualifies as) a manufacture or product (communication apparatus or system or components thereof).

BRIEF DESCRIPTION OF DRAWINGS

FIG. 5 is a diagram showing an example of a table held in the processing rule storage unit of the forwarding node in the first exemplary embodiment.

FIG. 6 is a diagram showing an example of synchronization confirmation information held in the synchronization confirmation information storage unit of the forwarding node in the first exemplary embodiment.

FIG. 7 is a diagram showing an example of a table held in the processing rule storage unit of the control device in the first exemplary embodiment.

FIG. 8 is a diagram showing an example of a table held in the synchronization confirmation information storage unit of the control device in the first exemplary embodiment.

FIG. 14 is a diagram showing an example of synchronization confirmation information of in the forwarding node in a second exemplary embodiment.

FIG. 15 is a diagram showing an example of a table held in the control device in the second exemplary embodiment.

FIG. 16 is a diagram showing an example of the comparison operation using generation management information.

PREFERRED MODES

Figure 1:
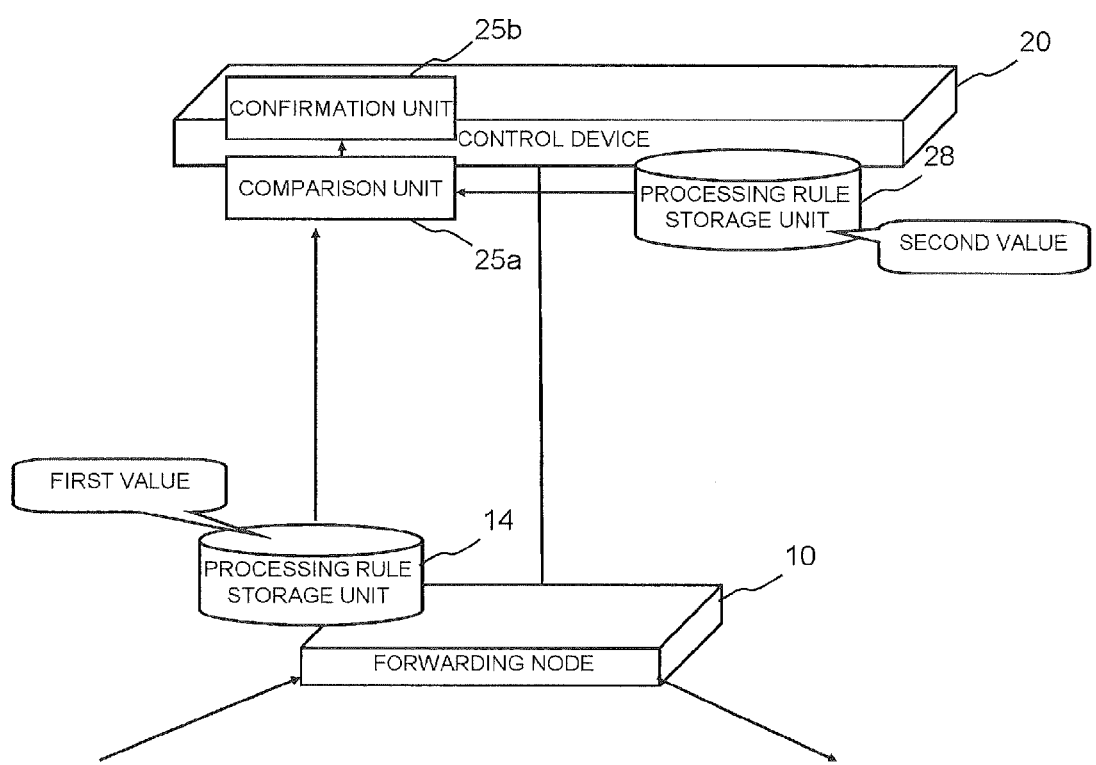
FIG. 1 is a diagram showing the outline of (a mode of) the present disclosure.

First, the outline of a mode of the present disclosure will be described below with reference to FIG. 1 and FIG. 2. Note that the drawing reference numerals in the outline are attached to the elements for convenience as an example to help understanding of the present disclosure but do not limit the present disclosure to the mode shown in the figures.

As shown in FIG. 1, the present mode may be implemented by the configuration ("arrangement") comprising a control device 20 that determines the processing rules of a packet and a forwarding node 10 that processes a received packet using a processing rule that corresponds to the received packet and that is one of the multiple processing rules received from the control devices 20 and stored in a processing rule storage unit 14.

In addition, the control device 20 comprises a comparison unit 25a and a confirmation unit 25b. The comparison unit 25a compares a first value, calculated from a first processing rule group held in the forwarding node side, with a second value calculated from a second processing rule group determined by the control device for transmission to the forwarding node. The confirmation unit 25b confirms the synchronization state of the processing rules between the forwarding node and the control device based on the comparison result. Although FIG. 1 shows an example of the configuration in which the control device 20 comprises the comparison unit 25a and the confirmation unit 25b, the configuration is not limited to this example. The comparison unit 25a and the confirmation unit 25b may be installed in one or both of the control device 20 and the forwarding node 10 or may be installed in a device other than the control device and the forwarding node 10. As described above, the synchronization confirmation is performed, not by generating a first value representing each of the processing rules, but by generating a first value representing a processing rule group composed of multiple processing rules. This synchronization confirmation method reduces the amount of network traffic generated for confirming synchronization between the control device 20 and the forwarding node 10.

The following describes an example of how to calculate the first value and the second value described. The first value is calculated using a predetermined function (for example, a hash function such as Message Digest Algorithm 5 (MD5)) that uses, as its argument, a set of multiple processing rules, all processing rules, or the values of a particular field of the processing rules held in the processing rule storage unit 14 of the forwarding node 10. That is, the first value is a value representing the processing rule group held in the processing rule storage unit 14 at that time. Similarly, the second value is calculated using the same function as the predetermined function described above using, as its argument, multiple processing rules, all processing rules, or the values of a particular field of the processing rules held in a processing rule storage unit 28 at that time. Because both values match if the forwarding node 10 and the control device 20 are synchronized, the comparison between the first value and the second value allows the arrangement to confirm the synchronization state between the forwarding node 10 and the control device 20.

Figure 2:
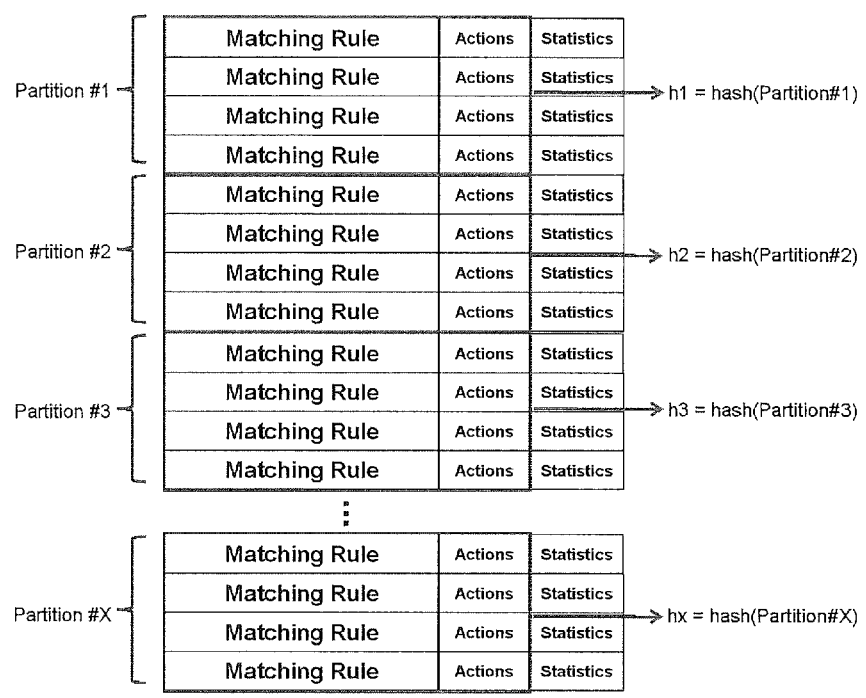
FIG. 2 is a diagram showing an example of the method for calculating first and second values.

The first value and the second value may also be calculated, not by the entire set of processing rules, but hierarchically as shown in FIG. 2. In the example in FIG. 2, for the processing rules held in the processing rule storage unit 14 of the forwarding node 10 and in the processing rule storage unit 28 of the control device 20, the values (h1, h2, h3, ..., hx) representing each of the predetermined parts (denoted as partitions in FIG. 2) are first calculated for each of the predetermined parts using a predetermined function (such as a hash function). The value (third value) representing each part may be calculated from the processing rule group included in each partition. The value (third value) representing each part may also be calculated by calculating the hash value for each processing rule included in each partition and by calculating the hash value of the partition from the hash values each corresponding to each processing rule. Similarly, for the control device 20, the value (fourth value) representing each part corresponding to the part of the forwarding node 10 is calculated. In the example in FIG. 2, the values obtained in this way (h1, h2, h3, ..., hx) are assigned to the predetermined function (hash(h1, h2, h3, ..., hx) in FIG. 2) to calculate the first value (or second value). By comparing the first value (or second value) obtained in this way, not only the synchronization state between the forwarding node 10 and the control device 20 may be confirmed but also, if a mismatch is found and an out-of-synchronization is detected, a mismatch position may be narrowed in stages by comparing the values (third or fourth values) calculated for each part. Even if a mismatch is found between the first value and the second value, the method of the mode does not confirm the synchronization of each processing rule but narrows the mismatch position in stages, thus reducing the amount of network traffic generated for confirming the synchronization between the control device 20 and the forwarding node 10.

Although the control device 20 comprises the processing rule storage unit 28 in the example in FIG. 1, another configuration is also possible in which the control device 20 accesses an external processing rule storage unit to manage the processing rules that are set in the forwarding node 10.

First Exemplary Embodiment

Figure 3:
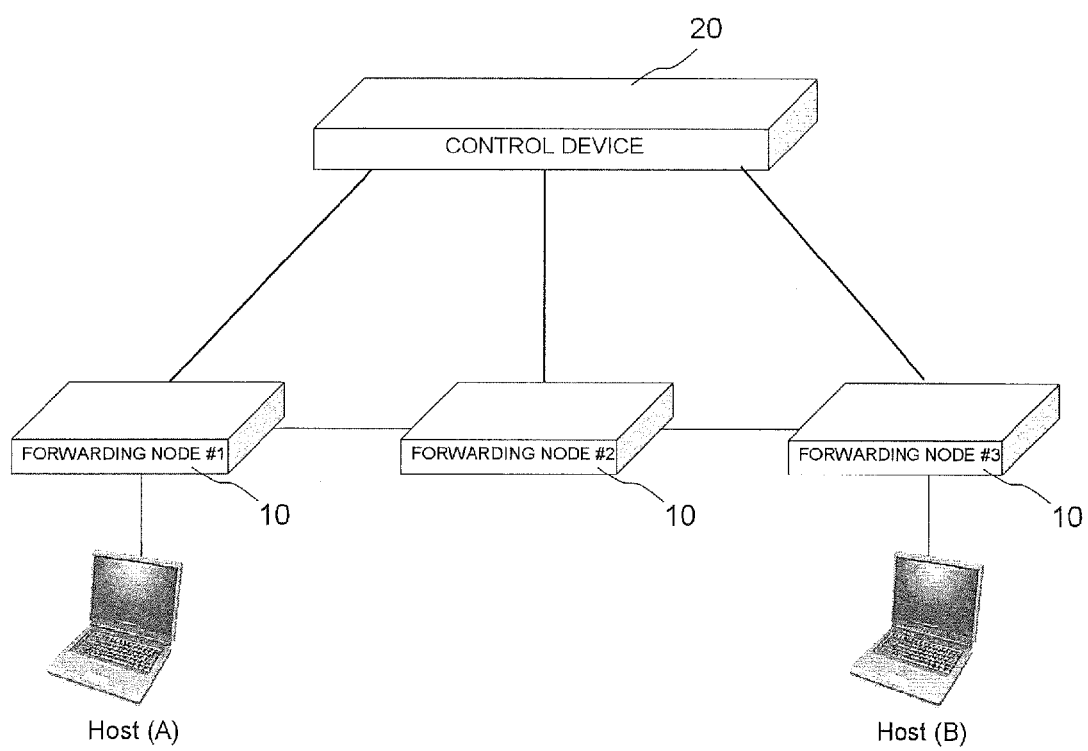
FIG. 3 is a diagram showing the configuration of a first exemplary embodiment.

Next, a first exemplary embodiment will be described more in detail with reference to the drawings. FIG. 3 is a diagram showing the configuration of a communication system in the first exemplary embodiment. Referring to FIG. 3, three forwarding nodes 10, a control device 20, and hosts (Host(A), Host(B)) that communicate with each other via the forwarding nodes 10 are shown. Although the three forwarding nodes 10, control device 20, and two hosts (Host(A), Host(B)) are shown in the example in FIG. 3, the numbers of forwarding nodes, control devices, and hosts are exemplary only and any number of forwarding nodes, control devices, and hosts may be used.

Figure 4:
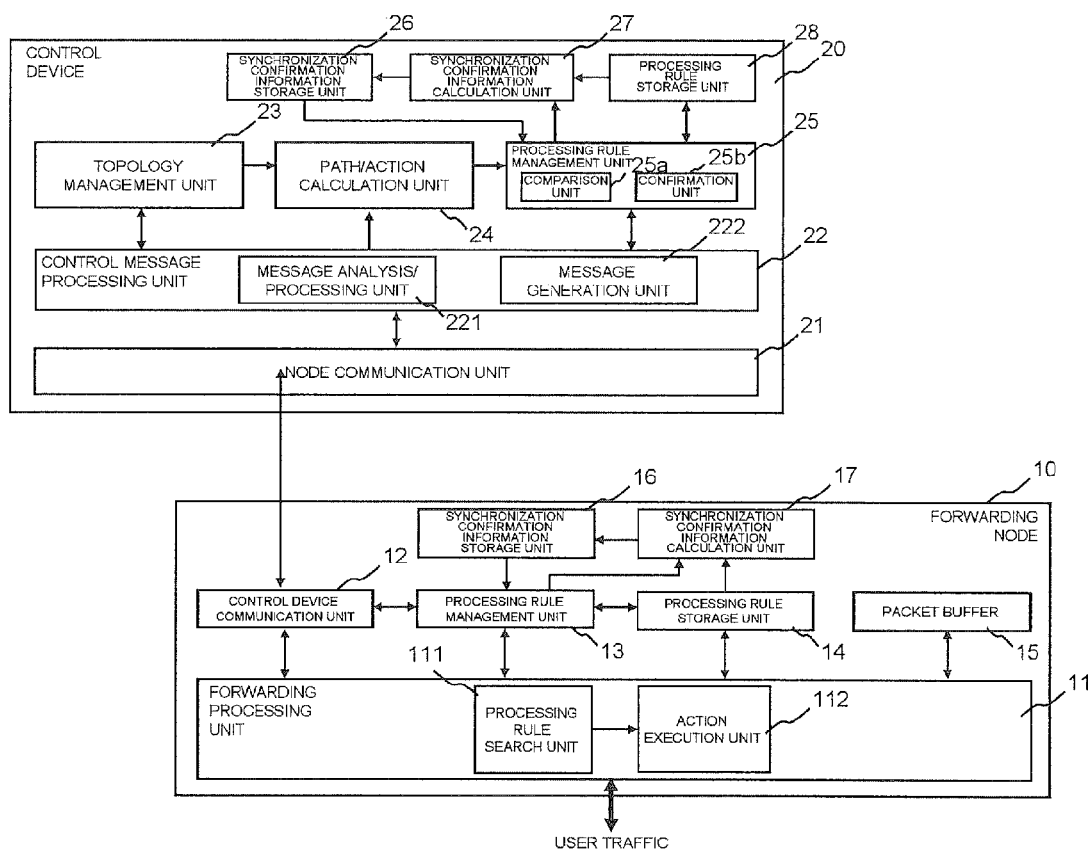
FIG. 4 is a block diagram showing the detailed configuration of a control device and a forwarding node in the first exemplary embodiment.

FIG. 4 is a block diagram showing the detailed configuration of the forwarding node 10 and the control device 20. Referring to FIG. 4, the forwarding node 10 comprises a forwarding processing unit 11, a control device communication unit 12 that communicates with the control device 20, a processing rule management unit 13 that manages a processing rule storage unit 14, a packet buffer 15, a synchronization confirmation information storage unit 16, and a synchronization confirmation information calculation unit 17. Note that forwarding node 10 is not always required to comprise the packet buffer 15.

Figure 18:
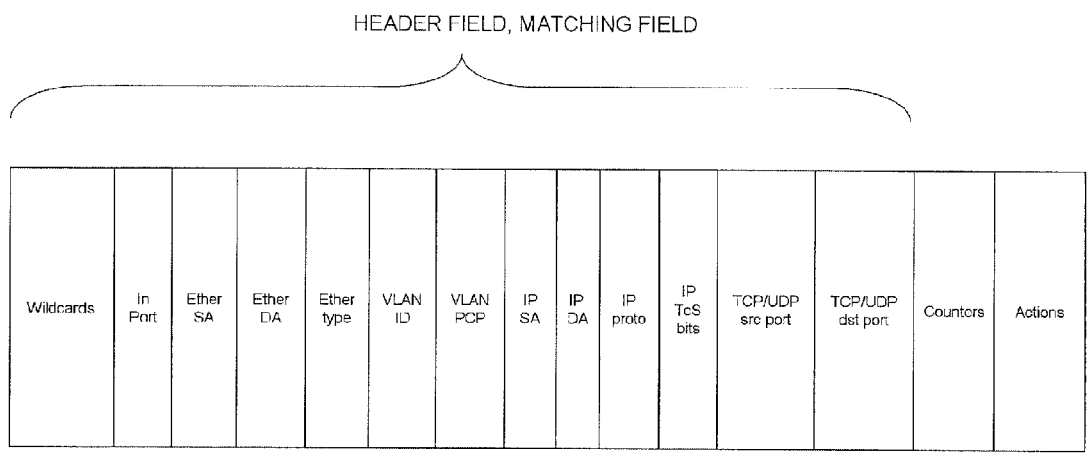
FIG. 18 is a diagram showing the configuration of a flow entry described in Non-Patent Literature 2.

FIG. 5 is a diagram showing an example of a processing rule storage table held in the processing rule storage unit 14. The Priority field indicates the priority of each processing rule. Matching Rule and Actions (Actions) correspond respectively to Matching Rule (Matching rule) and Actions (Actions) of a flow entry of the OpenFlow switch shown in FIG. 18. The Partition # field indicates the number of a partition to which each entry belongs. The flow statistical information (Stats) field, though omitted in the example in FIG. 5, may be added (Note that flow statistical information (Stats), which varies each time a packet is received, is not used for creating the synchronization confirmation information that will be described later). Therefore, the processing rule storage table in FIG. 5 is a table created by adding the Priority field and the Partition # field to a flow entry of the OpenFlow switch described in Non-Patent Literature 2. Note that the table in FIG. 5 is exemplary only and that the table format is not limited by the format of the OpenFlow technology described in Non-Patent Literature 2.

The forwarding processing unit 11 comprises a processing rule search unit 111 and an action execution unit 112. The processing rule search unit 111 outputs the processing content (Actions) of a processing rule, which has a matching rule (matching rule) that matches a received packet, from the processing rule storage unit 14 with the configuration described above to the action execution unit 112. The action execution unit 112 executes the processing content (Actions) output from the processing rule search unit 111.

When a processing rule addition instruction, which has processing rule registration position information, is received from the control device 20 via the control device communication unit 12, the processing rule management unit 13 adds the specified processing rule to a position in the table in the processing rule storage unit 14 wherein the position corresponds to the processing rule registration position information. If there is a processing rule in the processing rule storage unit 14 for which a matching packet is not received for a predetermined time or longer, the processing rule management unit 13 deletes the processing rule and, at the same time, transmits the notification to the control device 20 (timeout processing) based on an advance instruction received from the control device 20. Whether to transmit a notification to the control device 20 when a processing rule is deleted, one of the options, Notification or Non-notification, may be specified by the advance instruction that is transmitted from the control device 20 as described above.

FIG. 6 is a diagram showing an example of synchronization confirmation information calculated by the synchronization confirmation information calculation unit 17 and held in the synchronization confirmation information storage unit 16. Each of the Hp1-Hpx fields stores the hash value (hereinafter called "partition synchronization confirmation information") calculated for each partition of the processing rule storage table described above with the processing rule as the argument. The Htable field stores the hash value (hereinafter called "table synchronization confirmation information") calculated with the values of the Hp1-Hpx fields as the argument.

The synchronization confirmation information uniquely identifies the processing rule groups held in a forwarding node and the processing rule groups belonging to each partition respectively. In the description below, it is assumed that 0x1abf, 0xa87f, 0x29ca, . . . , 0xa9ba are calculated from the processing rules in FIG. 5 as the partition synchronization confirmation information Hp1, Hp2, Hp3, . . . , Hpx in FIG. 6 and that 0x1a86 is calculated from the partition synchronization confirmation information Hp1-Hpx in FIG. 6 as the table synchronization confirmation information Htable.

The synchronization confirmation information calculation unit 17 calculates the synchronization confirmation information when the addition of a processing rule, specified by a processing rule addition instruction from the control device 20, is completed or when a processing rule held in the processing rule storage unit 14 is changed or moved, for example, when the processing rule timeout processing is performed.

The forwarding node 10 described above may be implemented by adding the functions, corresponding to the processing rule management unit 13, synchronization confirmation information storage unit 16, and synchronization confirmation information calculation unit 17, to the OpenFlow switch described in Non-Patent Literature 2 and, at the same time, by changing the configuration of the flow table so that the partition number may be held for each processing rule as in the processing rule storage unit 14 described above. Note that the functions corresponding to the processing rule management unit 13, synchronization confirmation information storage unit 16, and synchronization confirmation information calculation unit 17 are not limited to the functions based on the technology of OpenFlow. The functions corresponding to the processing rule management unit 13, synchronization confirmation information storage unit 16, and synchronization confirmation information calculation unit 17 of the forwarding node 10 described above may also be implemented by the programs executed by a computer that configures the forwarding node 10.

Referring again to FIG. 4, the following describes the configuration of the control device 20. The control device 20 comprises a node communication unit 21 that carries out communication with the forwarding node 10; a control message processing unit 22; a topology management unit 23 that creates network topology information based on the connection relation of the forwarding node 10 collected via the node communication unit 21; a path/action calculation unit 24 that determines a packet forwarding path and actions to be executed by the forwarding nodes 10 on the forwarding path based on the network topology information created by the topology management unit 23; a processing rule management unit 25 that performs management so that the contents of the processing rule storage unit 28 become consistent with the contents of the processing rule storage unit 14 of each forwarding node 10 when a processing rule is transmitted to, or set in, the forwarding node 10 or when a processing rule timeout notification is received from the forwarding node 10;

a synchronization confirmation information storage unit 26; a synchronization confirmation information calculation unit 27; and the processing rule storage unit 28.

In addition, the control message processing unit 22 comprises a message analysis/processing unit 221 that analyzes a control message received from the forwarding node 10 and performs necessary processing; and a message generation unit 222 that generates a message to be transmitted to the forwarding node 10.

The processing rule management unit 25 of this exemplary embodiment has the function corresponding to the comparison unit 25a and the confirmation unit 25b described in the outline of the present mode above. The processing rule management unit 25 has the function, which is triggered by the generation of a predetermined synchronization confirmation event such as the elapse of a predetermined time interval, to request the forwarding node 10 to transmit the table synchronization confirmation information and partition synchronization confirmation information, as well as the processing rule of a mismatching partition, via the control message processing unit 22 and the node communication unit 21 for performing the synchronization confirmation processing. Note that the comparison unit 25a and the confirmation unit 25b need not always be installed in the processing rule management unit 25 of the control device 20. The comparison unit 25a and the confirmation unit 25b may be installed either in one of the control device 20 and the forwarding node 10 or in the control device 20 and forwarding node 10, one for each. Both or one of the comparison unit 25a and the confirmation unit 25b may be installed in a device in the system other than the control device 20 and the forwarding node 10.

FIG. 7 is a diagram showing an example of the processing rule storage table held in the processing rule storage unit 28 of the control device 20. As shown in FIG. 7, the processing rule storage unit 28 of the control device 20 holds all processing rules that are held in the processing rule storage units 14 of the forwarding nodes 10 controlled by the control device 20. For example, the first to third entries from the top of the table in FIG. 7 indicate, for a flow where the matching rule is A, the processing rules that are set in the nodes whose DPIDs (identifier of node 10: Datapath Identifier) are 1-3 (the fourth to sixth entries from the top indicate the processing rules in the same way). Although stored with a matching rule as the key in the example in FIG. 7, the processing rules may also be stored with DPID or Partition# as the key.

When a packet corresponding to the matching rule "A" as indicated by the first entry from the top of the table described above is received, the node whose DPID is 1 (for example, node #1 in FIG. 3) performs the processing to output from the ninth port according to the Actions field. Similarly, when a packet corresponding to the matching rule "A" is received from the node whose DPID is 1 (for example, node #1 in FIG. 3), the node whose DPID is 2 (for example, node #2 in FIG. 3) performs the processing to output from the sixth port. When a packet corresponding to the matching rule "A" is received from the node whose DPID is 2 (for example, node #2 in FIG. 3), the node whose DPID is 3 (for example, node #3 in FIG. 3) performs the processing to output from the first port. In this way, the control processing is performed to forward a packet, corresponding to the matching rule "A", via a specified path.

FIG. 8 is a diagram showing an example of the synchronization confirmation information storage table held in the synchronization confirmation information storage unit 26. The value of each field is equivalent to that described in FIG. 6. The change content field in FIG. 8, which describes a change in the synchronization confirmation information, may be omitted in the actual table. The table shown in FIG. 8 is the table for the node whose DPID is 1. The synchronization confirmation information storage unit 26 holds multiple tables each corresponding to the node corresponding to each DPID (The table having the format shown in FIG. 8 is provided for the node corresponding to each DPID).

For example, as shown in the change content field in FIG. 8, when a processing rule for matching rule A is added to partition #1 of the forwarding node with DPID #1, the partition synchronization confirmation information Hp1 calculated from partition #1 and the table synchronization confirmation information Htable calculated from the partition synchronization confirmation information Hp1-Hpx are changed. Similarly, when a notification is received from the forwarding node with DPID #1 indicating that a processing rule for matching rule A is deleted because a timeout occurs, the partition synchronization confirmation information Hp1 calculated from partition #1 and the table synchronization confirmation information Htable calculated from the partition synchronization confirmation information Hp1-Hpx are returned to the values in the initial state.

Although the synchronization confirmation information storage unit 26 and the processing rule storage unit 28 are included in the control device 20 in the configuration shown in FIG. 4, another configuration may be employed in which the synchronization confirmation information storage unit 26 and the processing rule storage unit 28 are included in an external server provided separately.

Based on the OpenFlow controller described in Non-Patent Literatures 1 and 2, the control device 20 described above may be implemented by adding the function and configuration corresponding to the processing rule management unit 25, synchronization confirmation information storage unit 26, synchronization confirmation information calculation unit 27, and processing rule storage unit 28 that calculate and manage the synchronization confirmation information when processing rules are changed or moved. Note that the control device 20 is not limited to the configuration based on the technology of OpenFlow. The functions corresponding to the processing rule management unit 25 and the synchronization confirmation information calculation unit 27 of the control device 20 described above may also be implemented by the program(s) executed by a computer that configures the control device 20.

Figure 9:
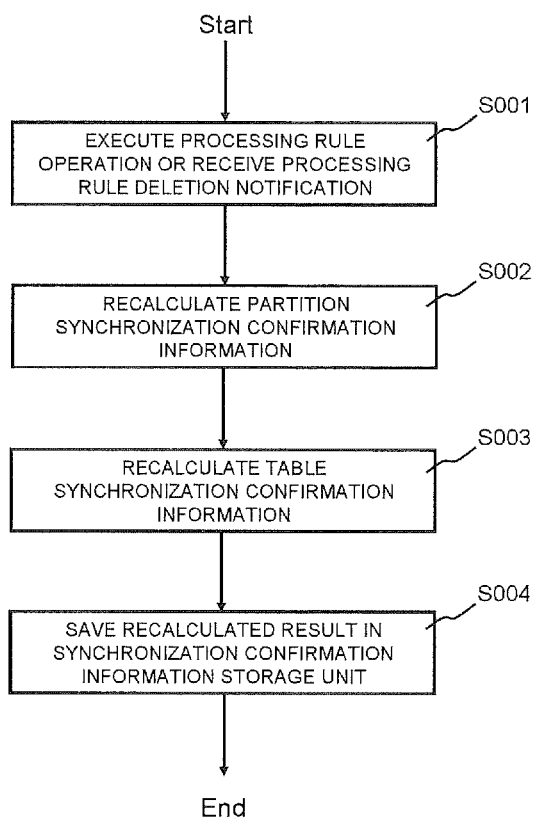
FIG. 9 is a flowchart showing the calculation operation of synchronization confirmation information in the control device in the first exemplary embodiment.

Next, the following describes the operation of this exemplary embodiment more in detail with reference to the drawings. FIG. 9 is a flowchart showing the operation for calculating the synchronization confirmation information in the control device 20 of the first exemplary embodiment.

Referring to FIG. 9, when an operation (add, change, delete) of a processing rule held in the forwarding node 10 occurred or a notification to delete a processing rule from the forwarding node 10 is received (step S001), the control device 20 recalculates the corresponding partition synchronization confirmation information on the forwarding node in which the processing rule to be operated on or deleted is held (step S0002).

When the recalculation of the partition synchronization confirmation information is completed, the control device 20 recalculates the table synchronization confirmation information using the partition synchronization confirmation information including the calculated partition synchronization confirmation information described above (step S003).

Finally, the control device 20 saves the recalculated partition synchronization confirmation information and the table synchronization confirmation information in the synchronization confirmation information storage unit 26 (step S004).

Figure 10:
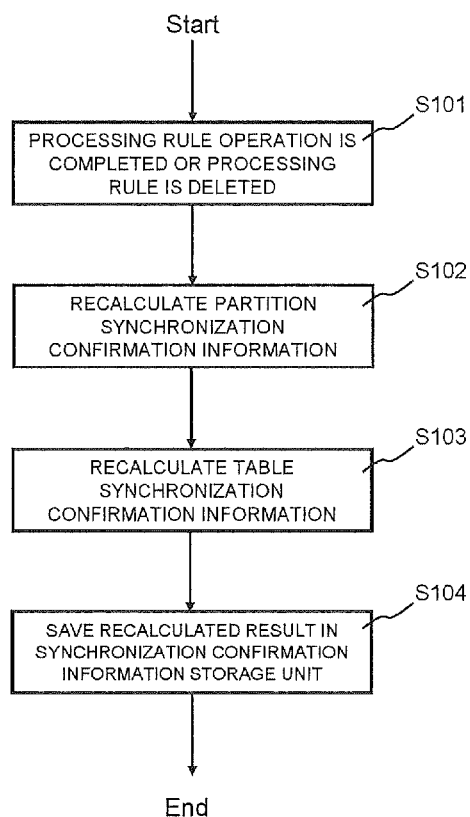
FIG. 10 is a flowchart showing the calculation operation of synchronization confirmation information in the forwarding node in the first exemplary embodiment.

FIG. 10 is a flowchart showing the operation for calculating the synchronization confirmation information in the forwarding node 10 of the first exemplary embodiment. Referring to FIG. 10, when a processing rule operation (add, change, delete) based on an instruction from the control device 20 is completed or when a processing rule is deleted when a processing rule timeout occurs (step S101), the forwarding node 10 recalculates the partition synchronization confirmation information on the partition in which the processing rule to be operated on or deleted is included (step S102).

When the recalculation of the partition synchronization confirmation information is completed, the forwarding node 10 recalculates the table synchronization confirmation information using the partition synchronization confirmation information including the calculated partition synchronization confirmation information described above (step S103).

Finally, the forwarding node 10 saves the recalculated partition synchronization confirmation information and the table synchronization confirmation information in the synchronization confirmation information storage unit 16 (step S104).

Figure 11:
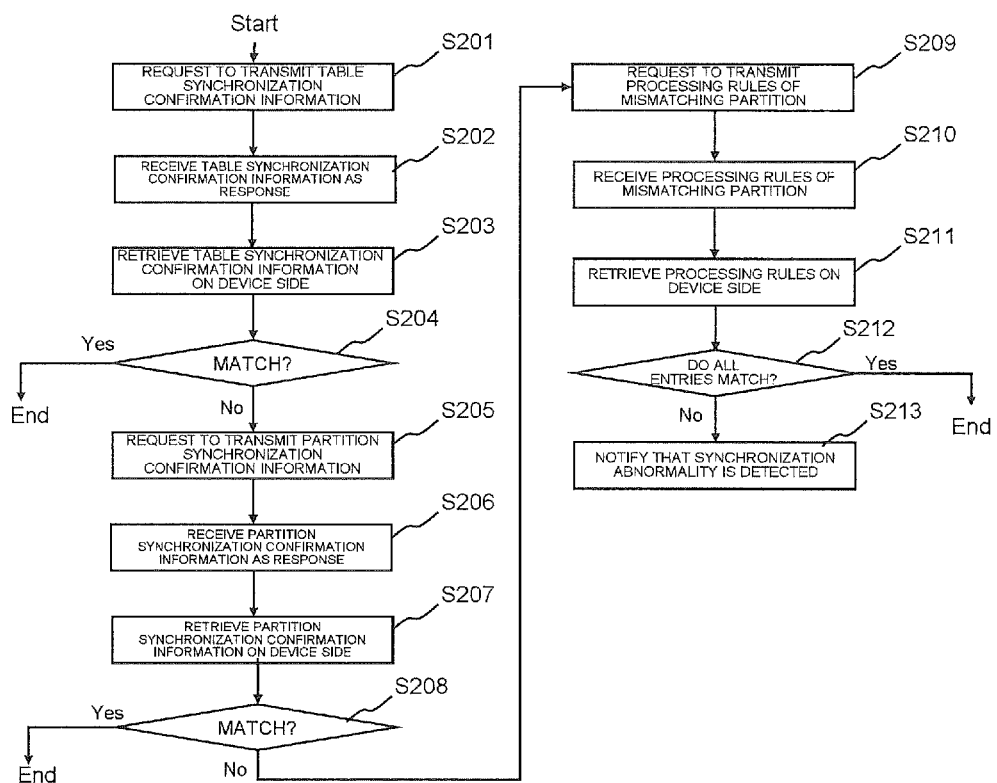
FIG. 11 is a flowchart showing the synchronization confirmation operation performed by the control device in the first exemplary embodiment.

FIG. 11 is a flowchart showing the synchronization confirmation operation performed by the control device 20 in the first exemplary embodiment. Referring to FIG. 11, when a predetermined synchronization confirmation event is generated, for example, when a predetermined time interval has elapsed, the control device 20 requests the forwarding node 10 to transmit the table synchronization confirmation information (step S201). The forwarding node 10 retrieves the table synchronization confirmation information Htable and transmits it to the control device 20.

When the table synchronization confirmation information Htable is received from the forwarding node 10 (step S202), the control device 20 retrieves the corresponding table synchronization confirmation information Htable from the synchronization confirmation information storage unit 26 (step S203).

Next, the control device 20 compares the table synchronization confirmation information Htable, received from the forwarding node 10, with the table synchronization confirmation information Htable calculated on the device side (step S204). If both match, the control device 20 determines that the forwarding node 10 and the control device 20 are synchronized. In this case, the synchronization confirmation processing is terminated (Yes in step S204).

On the other hand, if the table synchronization confirmation information Htable, received from the forwarding node 10, and the table synchronization confirmation information Htable, calculated on the device side, do not match, the control device 20 requests the forwarding node 10 to transmit the partition synchronization confirmation information (step S205). The forwarding node 10 retrieves the partition synchronization confirmation information Hp1-Hpx from the synchronization confirmation information storage unit 16 and transmits it to the control device 20.

When the partition synchronization confirmation information Hp1-Hpx is received from the forwarding node 10 (step S206), the control device 20 retrieves the corresponding partition synchronization confirmation information Hp1-Hpx from the synchronization confirmation information storage unit 26 (step S207).

Next, the control device 20 compares the partition synchronization confirmation information Hp1-Hpx, received from the forwarding node 10, with the partition synchronization confirmation information Hp1-Hpx calculated on the device side (step S208). If all pieces of partition synchronization confirmation information Hp1-Hpx match, the control device 20 determines that the forwarding node 10 and the control device 20 are synchronized. In this case, the synchronization confirmation processing is terminated (Yes in step S208).

On the other hand, if mismatching partition synchronization confirmation information is detected as a result of the comparison between the partition synchronization confirmation information Hp1-Hpx, received from the forwarding node 10, and the partition synchronization confirmation information Hp1-Hpx calculated on the device side, the control device 20 requests the forwarding node 10 to transmit the processing rules belonging to the mismatching partition (step S209). The forwarding node 10 retrieves the processing rules, corresponding to the partition number, from the processing rule storage unit 14 and transmits them to the control device 20.

When the processing rules of the mismatching partition are received from the forwarding node 10 (step S210), the control device 20 retrieves the processing rules of the mismatching partition from the processing rule storage unit 28 (step S211).

Next, the control device 20 compares the processing rules, received from the forwarding node 10, with the processing rules held on the device side (step S212). If all entries match, the control device 20 determines that the corresponding forwarding node 10 and the control device 20 are synchronized. In this case, the synchronization confirmation processing is terminated (Yes in step S212).

On the other hand, if a mismatching processing rule is detected as a result of the comparison between the processing rules, received from the forwarding node 10, and the processing rules held on the device side, the control device 20 notifies the predetermined network administrator terminal that a synchronization failure is detected (step S213).

Figure 12:
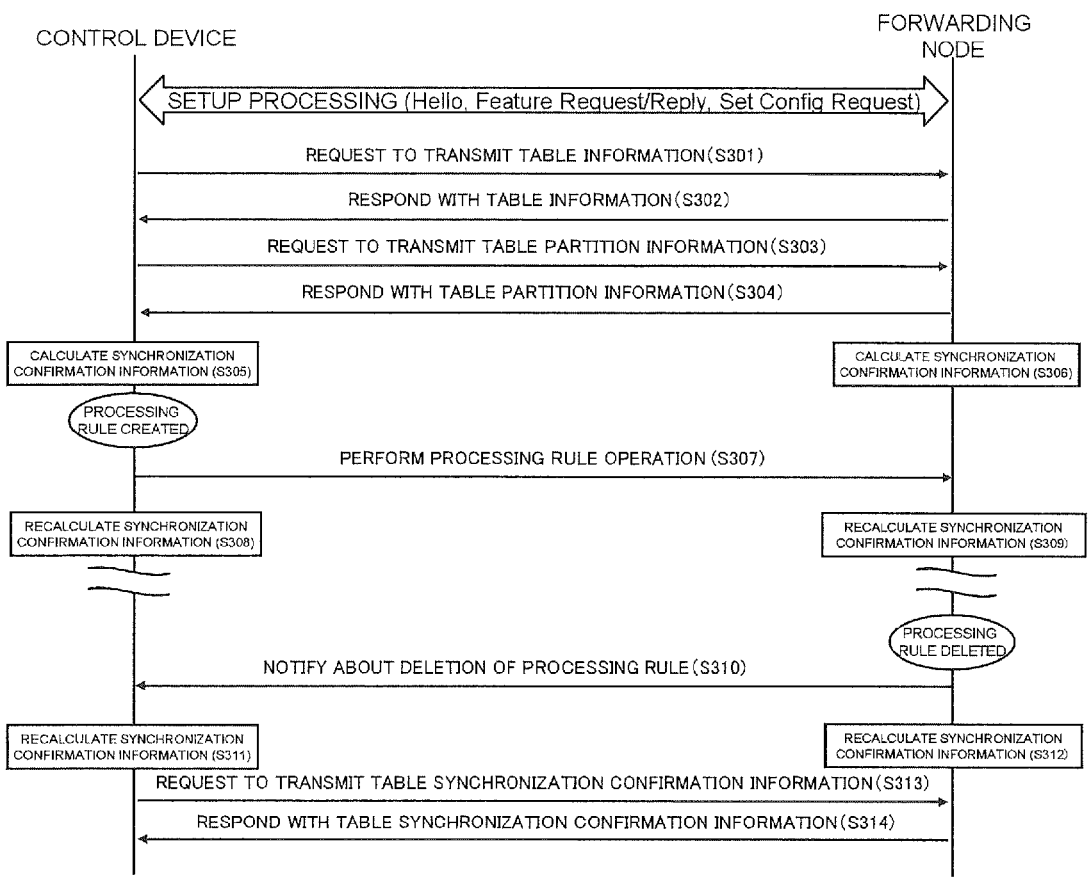
FIG. 12 is a diagram showing an example of the operation sequence in the first exemplary embodiment.
Figure 13:
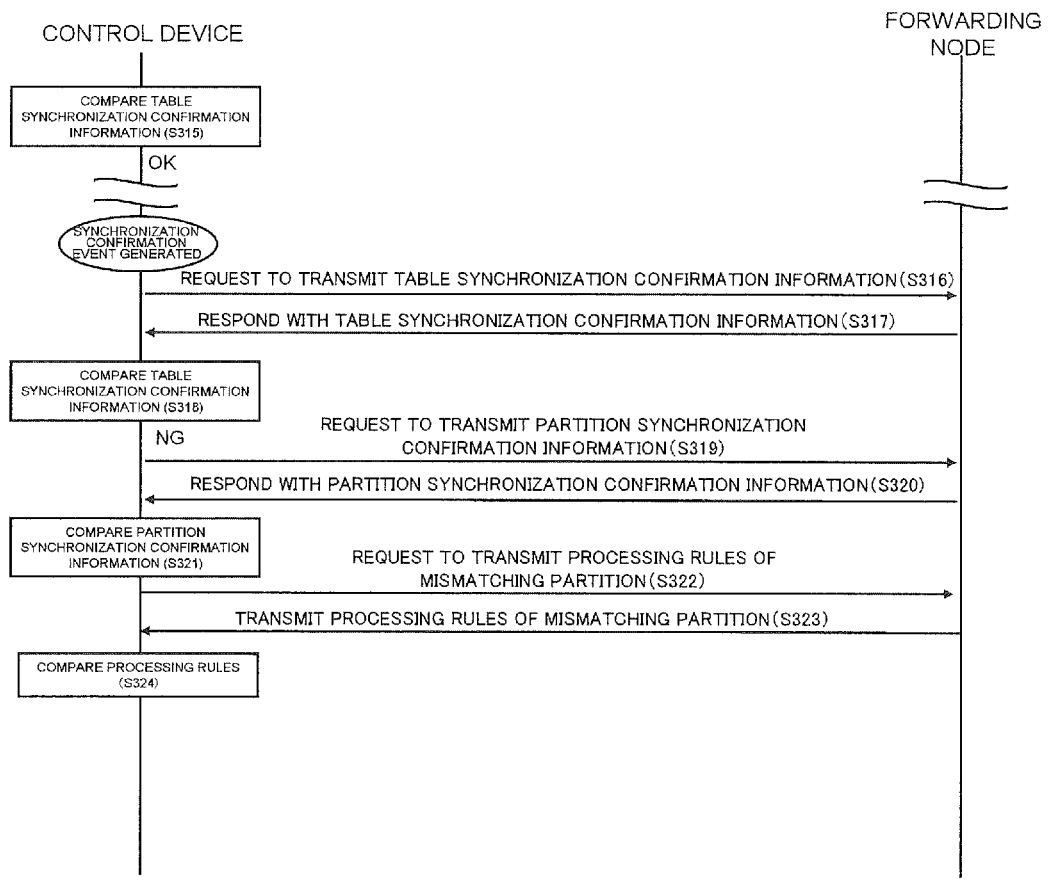
FIG. 13 is a diagram continued from FIG. 12.

Next, the following describes a series of the operation sequence between the forwarding node 10 and the control device 20 that can perform the synchronization confirmation information calculation processing and the synchronization confirmation processing described above. FIG. 12 and FIG. 13 are diagrams showing an example of the operation sequence between the forwarding node 10 and the control device 20 in the first exemplary embodiment.

Referring to FIG. 12, when the setup processing is performed to add the forwarding node 10 or to change the setting, the control device 20 requests the forwarding node 10 to transmit the configuration information on the processing rule storage table held in the processing rule storage unit 14 (S301 in FIG. 12). The forwarding node 10 responds with the configuration information on the processing rule storage table held in the processing rule storage unit 14 (S302 in FIG. 12). The configuration information on the processing rule storage table is, for example, size information on the processing rule storage table.

When the configuration information on the processing rule storage table is received, the control device 20 determines the partition information, including the partition configuration and the number of divisions of the processing rule storage table, based on the configuration information on the processing rule storage table and transmits the partition information on the processing rule storage table to the forwarding node 10 (S303 in FIG. 12: request to transmit table partition information). When the partition setting of the processing rule storage table is completed, the forwarding node 10 transmits a response to the control device 20 to indicate that the partition setting of the processing rule storage table is completed (S304 in FIG. 12: respond with table partition information).

When the partition setting of the processing rule storage table is completed, the control device 20 and the forwarding node 10 each calculate the synchronization confirmation information according to the flows shown in FIG. 9 and FIG. 10 (S305 and S306 in FIG. 12).

Next, when the control device 20 creates a processing rule and performs the setting operation for the processing rules held in the forwarding node 10 to respond to a processing rule setting request from the forwarding node 10 or to establish an initial state path (S307 in FIG. 12), the control device 20 and the forwarding node 10 each recalculate the synchronization confirmation information according to the flows shown in FIG. 9 and FIG. 10 (S308 and S309 in FIG. 12).

After that, when a timeout is generated for a processing rule that has been set, the forwarding node 10 deletes the processing rule and notifies the control device 20 about the deletion (S310 in FIG. 12). In this case, the control device 20 and the forwarding node 10 each recalculate the synchronization confirmation information according to the flows shown in FIG. 9 and FIG. 10 (S311 and S312 in FIG. 12).

After that, when the control device 20 requests the forwarding node 10 to transmit the table synchronization confirmation information according to the flow shown in FIG. 11 (S313 in FIG. 12), the forwarding node 10 retrieves the table synchronization confirmation information Htable from the synchronization confirmation information storage unit 16 and transmits it to the control device 20 (S314 in FIG. 12).

Next, referring to FIG. 13, when the table synchronization confirmation information Htable is received, the control device 20 compares the table synchronization confirmation information Htable, received from the forwarding node 10, with the corresponding table synchronization confirmation information Htable on the device side (S315 in FIG. 13). Because both match (OK) in the example in FIG. 13, the control device 20 once terminates the synchronization confirmation processing.

In the second comparison of the table synchronization confirmation information (S316-S318 in FIG. 13) in the example in FIG. 13, the table synchronization confirmation information Htable, received from the forwarding node 10, and the corresponding table synchronization confirmation information Htable on the device side do not match (NG). Therefore, the partition synchronization confirmation information Hp1-Hpx is compared between the control device 20 and the forwarding node 10 (S319-S321 in FIG. 13).

Because a mismatching partition is identified as a result of the comparison of the partition synchronization confirmation information Hp1-Hpx in the example in FIG. 13, the processing rules of the mismatching partition are compared between the control device 20 and the forwarding node 10 (S322-S324 in FIG. 13).

In this exemplary embodiment, the synchronization state of processing rules between the forwarding node 10 and the control device 20, which controls the forwarding node 10, can be confirmed at low costs as described above. Even if an out-of-synchronization condition is detected, only a part of the processing rules need be compared. Although the control device 20 interacts with one forwarding node 10 for synchronization confirmation in the exemplary embodiment described above, the same procedure may also be used to confirm the synchronization with multiple forwarding nodes 10. In this case too, if the forwarding node 10 and the control device 20 are synchronized, the processing is completed simply by comparing the table synchronization confirmation information and, therefore, the exemplary embodiment is readily compatible with an increase in the number of synchronizing forwarding nodes 10 to be controlled. In addition, by adjusting the number of partitions, the load that will be generated when an out-of-synchronization condition is detected can be adjusted (amount of partition synchronization confirmation information to be compared and the number of processing rules).

Second Exemplary Embodiment

Next, a second exemplary embodiment will be described.

In the second exemplary embodiment, the synchronization confirmation information includes information for transaction generation management between a control device 20 and a forwarding node 10 (hereinafter called "generation management information").

FIG. 14 is a diagram showing an example of synchronization confirmation information calculated by a synchronization confirmation information calculation unit 17 of the forwarding node 10 and held in a synchronization confirmation information storage unit 16. The synchronization confirmation information includes the Ct field and the St field as the generation management information. The Ct field indicates a transaction ID attached to a processing rule operation control message transmitted from the control device 20 to the forwarding node 10. Similarly, the St field indicates a transaction ID attached to a processing rule operation control message transmitted from the forwarding node 10 to the control device 20. The Hp1-Hpx fields store partition synchronization confirmation information that is the hash value calculated for each partition of the above-described processing rule storage table with the processing rules as the argument. The Htable field stores the table synchronization confirmation information that is the hash value calculated with the values of the Hp1-Hpx fields as the argument.

Therefore, the example of the synchronization confirmation information shown in FIG. 14 uniquely identifies the processing rule group held in the forwarding node, as well as the processing rule group belonging to each partition, after each of the control device 20 and the forwarding node 10 has transmitted a processing rule operation control message two times.

FIG. 15 is a diagram showing an example of the synchronization confirmation information storage table held in a synchronization confirmation information storage unit 26 of the control device 20. The values of the fields are the same as those described in FIG. 14 but are different from those in FIG. 14 in that the Ct field and the St field are used by the control device 20 as the generation management information to hold the synchronization confirmation information for multiple generations. The change content field in FIG. 15, which describes a change in the synchronization confirmation information, may be omitted in the actual table. The table in FIG. 15 is a table for a node whose DPID is 1. The synchronization confirmation information storage unit 26 holds multiple tables, one for a node corresponding to each DPID (The table with the format shown in FIG. 8 is provided for each node corresponding to each DPID).

For example, as shown in the change content field in FIG. 15, when a processing rule for matching rule A is added to partition #1 of the forwarding node with DPID#1, 1 is added to the value of the Ct field. In this case, the partition synchronization confirmation information Hp1, calculated from partition #1, and the table synchronization confirmation information Htable, calculated from the partition synchronization confirmation information Hp1-Hpx, are changed. Similarly, when a notification is received from the forwarding node with DPID#1 to indicate that the processing rule for matching rule A has been deleted because a timeout is generated, 1 is added to the value of the St field. In this case, the partition synchronization confirmation information Hp1, calculated from partition #1, and the table synchronization confirmation information Htable, calculated from the partition synchronization confirmation information Hp1-Hpx, are returned to the values in the initial state.

Next, with reference to FIG. 11 used in the description of the operation of the first exemplary embodiment, the following describes the synchronization confirmation operation performed by the control device 20 in the second exemplary embodiment. Referring to FIG. 11, when a predetermined synchronization confirmation event is generated, for example, when a predetermined time interval has elapsed, the control device 20 requests the forwarding node 10 to transmit the table synchronization confirmation information (step S201). The forwarding node 10 retrieves the generation management information Ct and St and the table synchronization confirmation information Htable from the synchronization confirmation information storage unit 16 and transmits them to the control device 20.

When the generation management information Ct and St and the table synchronization confirmation information Htable are received from the forwarding node 10 (step S202), the control device 20 retrieves the table synchronization confirmation information Htable, which contains the corresponding generation management information Ct and St, from the synchronization confirmation information storage unit 26 (step S203).

Next, the control device 20 compares the table synchronization confirmation information Htable, received from the forwarding node 10, with the table synchronization confirmation information Htable calculated on the device side (step S204). If both match, the control device 20 determines that the forwarding node 10 and the control device 20 are synchronized. In this case, the synchronization confirmation processing is terminated (Yes in step S204).

On the other hand, if the table synchronization confirmation information Htable, received from the forwarding node 10, and the table synchronization confirmation information Htable, calculated on the device side, do not match, the control device 20 requests the forwarding node 10 to transmit the partition synchronization confirmation information (step S205). The forwarding node 10 retrieves the generation management information Ct and St and the partition synchronization confirmation information Hp1-Hpx from the synchronization confirmation information storage unit 16 and transmits them to the control device 20.

When the generation management information Ct and St and the partition synchronization confirmation information Hp1-Hpx are received from the forwarding node 10 (step S206), the control device 20 retrieves the partition synchronization confirmation information Hp1-Hpx, which has the corresponding generation management information Ct and St, from the synchronization confirmation information storage unit 26 (step S207).

Next, the control device 20 compares the partition synchronization confirmation information Hp1-Hpx, received from the forwarding node 10, with the partition synchronization confirmation information Hp1-Hpx calculated on the own device side (step S208). If all pieces of partition synchronization confirmation information Hp1-Hpx match, the control device 20 determines that the forwarding node 10 and the control device 20 are synchronized. In this case, the synchronization confirmation processing is terminated (Yes in step S208).

On the other hand, if mismatching partition synchronization confirmation information is detected as a result of the comparison between the partition synchronization confirmation information Hp1-Hpx, received from the forwarding node 10, and the partition synchronization confirmation information Hp1-Hpx calculated on the device side, the control device 20 requests the forwarding node 10 to transmit the processing rules belonging to the mismatching partition (step S209). The forwarding node 10 retrieves the processing rules, corresponding to the partition number, from the processing rule storage unit 14 and transmits them to the control device 20.

When the processing rules of the mismatching partition are received from the forwarding node 10 (step S210), the control device 20 retrieves the processing rules of the mismatching partition from the processing rule storage unit 28 (step S211).

Next, the control device 20 compares the processing rules, received from the forwarding node 10, with the processing rules held on the own device side (step S212). If all entries match, the control device 20 determines that the corresponding forwarding node 10 and the control device 20 are synchronized. In this case, the synchronization confirmation processing is terminated (Yes in step S212).

On the other hand, if a mismatching processing rule is detected as a result of the comparison between the processing rules, received from the forwarding node 10, and the processing rules held on the own device side, the control device 20 notifies the predetermined network administrator terminal that a synchronization failure is detected (step S213).

Next, with reference to FIG. 12 and FIG. 13 used in the description of the first exemplary embodiment, the following describes a series of the operation sequence between the forwarding node 10 and the control device 20 in the second exemplary embodiment.

When the setup processing is performed to add the forwarding node 10 or to change the setting, the control device 20 requests the forwarding node 10 to transmit the configuration information on the processing rule storage table held in the processing rule storage unit 14 (S301 in FIG. 12). The forwarding node 10 responds with the configuration information on the processing rule storage table held in the processing rule storage unit 14 (S302 in FIG. 12).

When the configuration information on the processing rule storage table is received, the control device 20 determines the partition information, including the partition configuration and the number of divisions of the processing rule storage table, based on the configuration information on the processing rule storage table and transmits the partition information on the processing rule storage table to the forwarding node 10 (S303 in FIG. 12). When the partition setting of the processing rule storage table is completed, the forwarding node 10 transmits a response to the control device 20 to indicate that the partition setting of the processing rule storage table is completed (S304 in FIG. 12).

When the partition setting of the processing rule storage table is completed, the control device 20 and the forwarding node 10 each calculate the synchronization confirmation information according to the flows shown in FIG. 9 and FIG. 10 (S305 and S306 in FIG. 12). In this stage, the synchronization confirmation information having the generation management information Ct=0 and St=0, such as the one shown in the first row from the top of the synchronization confirmation information table in FIG. 15, is calculated.

Next, when the control device 20 creates a processing rule and performs the setting operation for the processing rules held in the forwarding node 10 to respond to a processing rule setting request from the forwarding node 10 or to establish an initial state path (S307 in FIG. 12), the control device 20 and the forwarding node 10 each recalculate the synchronization confirmation information according to the flows shown in FIG. 9 and FIG. 10 (S308 and S309 in FIG. 12). In this stage, the synchronization confirmation information having the generation management information Ct=1 and St=0, such as the one shown in the second row from the top of the synchronization confirmation information table in FIG. 8, is calculated.

After that, when a timeout is generated for a processing rule that has been set, the forwarding node 10 deletes the processing rule and notifies the control device 20 about the deletion (S310 in FIG. 12). In this case, the control device 20 and the forwarding node 10 each recalculate the synchronization confirmation information according to the flows shown in FIG. 9 and FIG. 10 (S311 and S312 in FIG. 12). In this stage, the synchronization confirmation information having the generation management information Ct=1 and St=1, such as the one shown in the third row from the top of the synchronization confirmation information table in FIG. 8, is calculated.

After that, when the control device 20 requests the forwarding node 10 to transmit the table synchronization confirmation information (S313 in FIG. 12), the forwarding node 10 retrieves the generation management information Ct(=1) and St(=1) and the table synchronization confirmation information Htable from the synchronization confirmation information storage unit 16 and transmits them to the control device 20 (S314 in FIG. 12).

Next, referring to FIG. 13, when the generation management information Ct(=1) and St(=1) and the table synchronization confirmation information Htable are received, the control device 20 compares the table synchronization confirmation information Htable, received from the forwarding node 10, with the table synchronization confirmation information Htable on the device side having the corresponding generation management information (S315 in FIG. 13). Because both match (OK) in the example in FIG. 13, the control device 20 once terminates the synchronization confirmation processing.

In the second comparison of the table synchronization confirmation information (S316-S318 in FIG. 13) in the example in FIG. 13, the table synchronization confirmation information Htable, received from the forwarding node 10, and the table synchronization confirmation information Htable on the device side having the corresponding generation management information do not match (NG). Therefore, the partition synchronization confirmation information Hp1-Hpx is compared between the control device 20 and the forwarding node 10 (S319-S321 in FIG. 13).

Because a mismatching partition is identified as a result of the comparison of the partition synchronization confirmation information Hp1-Hpx in the example in FIG. 13, the processing rules of the mismatching partition are compared between the control device 20 and the forwarding node 10 (S322-S324 in FIG. 13).

In this exemplary embodiment, the control device 20 compares the synchronization confirmation information using the generation management information Ct and St. Therefore, even when a processing rule is newly created and set after a synchronization confirmation information request is issued as shown in FIG. 16, the synchronization state can be confirmed correctly.

Figure 17:
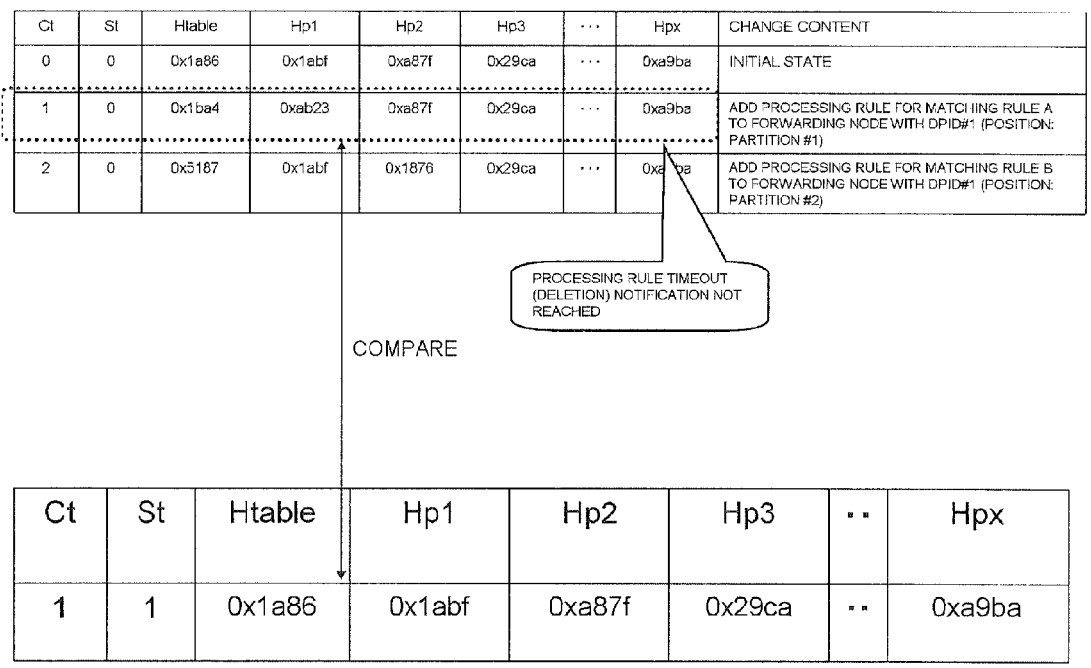
FIG. 17 is a diagram showing another example of the comparison operation using generation management information.

If a processing rule deletion notification from the forwarding node 10 does not reach the control device 20 as shown in FIG. 17, a situation may be created in which the synchronization confirmation information corresponding to the generation management information Ct and St may not be included in the synchronization confirmation information storage unit 26 of the control device 20 (the same situation will be created when a processing rule operation from the control device 20 does not reach the forwarding node 10). Even in such a case, the comparison processing may be performed by comparing the synchronization confirmation information with the latest synchronization confirmation information in the range in which the generation management information Ct and St notified from the forwarding node 10 is not exceeded.

Third Exemplary Embodiment

Next, a third exemplary embodiment will be described.

In the exemplary embodiments described above, hash values are used as an example of synchronization confirmation information. In the third exemplary embodiment, another example of synchronization confirmation information is used.

In the third exemplary embodiment, the number of processing rules held in processing rule storage units 14 and 28 and the number of processing rules held in each partition are used as the synchronization confirmation information.

As the synchronization confirmation information, a forwarding node (for example, the forwarding node whose DPID is 1) calculates Ntable (number of processing rules in the table stored in the processing rule storage unit 14 of this forwarding node) and Np1, Np2, . . . , Npx (number of processing rules of each partition of the table stored in the processing rule storage unit 14) and holds them in the table format. Each of the other forwarding nodes also holds the similar table.

As the synchronization confirmation information on the forwarding nodes to be managed, a control device 20 also calculates Ntable (for example, number of processing rules stored in the processing rule storage unit 28 for the forwarding node whose DPID is 1) and Np1, Np2, . . . , Npx (for example, number of processing rules of each partition of the processing rule group for the forwarding node whose DPID is 1) and stores them in the table format. The control device 20 holds the table, which includes Ntable, Np1, Nps, . . . , Npx, for each of the multiple forwarding nodes to be managed.

In the third exemplary embodiment, the synchronization between the forwarding node 10 and the control device 20 can be confirmed based on the result of comparison between the number of processing rules held in the forwarding node 10 and the number of processing rules held in the control device 20. In addition, if the number of processing rules match as the result of the comparison, the load of the control device 20 and the forwarding node 10 can be further reduced by reducing the number of times the synchronization confirmation information is calculated using the hash value of processing rules (see first and second exemplary embodiments) or by delaying the comparison of the synchronization confirmation information (see first and second exemplary embodiments).

Fourth Exemplary Embodiment

Next, a fourth exemplary embodiment will be described.

In the exemplary embodiments described above, hash values or the number of processing rules is used as an example of synchronization confirmation information. In the fourth exemplary embodiment, another example of synchronization confirmation information is used.

In the fourth exemplary embodiment, the version information on the table held in processing rule storage units 14 and 28 and the version information on the partitions of the table are used as the synchronization confirmation information.

As the synchronization confirmation information, a forwarding node (for example, the forwarding node whose DPID is 1) calculates Rtable (for example, version information on the processing rule storage table of the forwarding node whose DPID is 1) and Rp1, Rp2, . . . , Rpx (version information on each partition of the processing rule storage table) and holds them in the table format. Each of the other forwarding nodes also holds the similar table.

As the synchronization confirmation information on the forwarding nodes to be managed, a control device 20 also calculates Rtable (for example, version information on the processing rule group stored in a processing rule storage unit 28 for the forwarding node whose DPID is 1) and Rp1, Rp2, . . . , Rpx (for example, version information on each partition of the processing rules for the forwarding node whose DPID is 1) and stores them in the table format. The control device 20 holds the table, which includes Rtable, Rp1, Rp2, . . . , Rpx, for each of the multiple forwarding nodes to be managed. Rtable is generated to include the values reflecting the version information (Rp1, Rp2, . . . , Rpx) on the partitions.

When a processing rule of each partition is changed (addition, deletion, etc.), each of the forwarding node 10 and the control device 20 updates the version information on the partition (one of Rp1, Rp2, . . . , Rpx). As the version information on a partition (Rp1, Rp2, . . . , Rpx) is updated, the version information on the table itself (Rtable) is also updated. Rtable is updated to reflect which partition's version information is updated. For example, when the version information on partition 1 (Rp1) is updated, Rtable becomes a value reflecting the version information on partition 1 that is updated.

In the fourth exemplary embodiment, the synchronization between the forwarding node 10 and the control device 20 can be confirmed based on the result of comparison between the version information on the processing rules held in the forwarding node 10 and the version information on the processing rules held in the control device 20. In addition, if the version information matches as the result of the comparison, the load of the control device 20 and the forwarding node 10 can be further reduced by reducing the number of times the synchronization confirmation information is calculated using the hash value of processing rules (see first and second exemplary embodiments) or by delaying the comparison of the synchronization confirmation information (see first and second exemplary embodiments). Of course, the synchronization confirmation in this exemplary embodiment may be used in conjunction with the synchronization confirmation by means of the number of processing rules described in the third exemplary embodiment.

While the exemplary embodiments have been described, it is to be understood that the present disclosure is not limited to the exemplary embodiments described above and that further modifications, replacements, and adjustments may be added within the scope not departing from the basic technological concept of the present disclosure. For example, though the control device 20, comparison unit 25a, and confirmation unit 25b are used to perform the comparison processing in the exemplary embodiments above, it is also possible to employ a configuration in which a device, which manages the synchronization confirmation information and performs the comparison operation independently of the control device 20, is provided.

Although the method for calculating the synchronization confirmation information using a hash function, typified by MD5, is described as an example in the above exemplary embodiments, a method for simply performing synchronization confirmation using the checksum algorithm may also be employed. The method described in the exemplary embodiments as a method for calculating the synchronization confirmation information is exemplary only and another method may also be used for the calculation.

In the exemplary embodiments described above, the partition synchronization confirmation information is calculated and, using the calculation result, the table synchronization confirmation information is calculated to reduce the recalculation cost involved in changing or moving processing rules. Instead of this method, the partition synchronization confirmation information and the table synchronization confirmation information may also be calculated using separate algorithms.

Although the synchronization confirmation information with the generation management information Ct and St is held in the control device 20 in the exemplary embodiments described above, another configuration may also be employed in which the synchronization confirmation information with the generation management information Ct and St is held in the forwarding node 10 and the synchronization confirmation processing is performed by the processing rule management unit.

Finally, preferred modes of the present disclosure will be summarized.

[Mode 1]
(See the communication system according to the first aspect)

[Mode 2]
The communication system as defined by mode 1, wherein
based on a result of the comparison between the first value and the second value, said confirmation unit detects whether or not said forwarding node and said control device are out of synchronization.

[Mode 3]
The communication system as defined by mode 1 or 2, wherein
if a mismatch between the first value and the second value is detected, said confirmation unit compares a third value with a fourth value to detect an out-of-synchronization position, the third value calculated from a first part selected from the first processing rule group, the fourth value calculated from a second part of the second processing rule group corresponding to the first part.

[Mode 4]
The communication system as defined by one of modes 1-3, wherein
the first value and the second value can be calculated using the third value and the fourth value respectively.

[Mode 5]
The communication system as defined by mode 3 or 4, wherein
the first part and the second part are parts each selected from a table that stores the processing rules.

[Mode 6]
The communication system as defined by one of modes 1-5, wherein
when a processing rule is set, said control device notifies said forwarding node about a position in the table in which the processing rule is to be stored, and
after the processing rule is set, said forwarding node recalculates the first value or the third value and the first value respectively.

[Mode 7]
The communication system as defined by one of modes 3-6, wherein
if the first value and the second value do not match or if the third value and the fourth value do not match, said confirmation unit compares processing rules included in the processing rule groups in which the mismatch was detected.

[Mode 8]
The communication system as defined by one of modes 2-7, wherein
at least one of said control device and said forwarding node manages a plurality of generations by assigning generation management information to first to fourth values according to a predetermined rule, and
said comparison unit compares the first/third values with the second/fourth values that have matching generation management information.

[Mode 9]
(See the control device according to the second aspect)

[Mode 10]
(See the forwarding node according to the third aspect)

[Mode 11]
(See the communication control method according to the fourth aspect)

[Mode 12]
(See the program according to the fifth aspect)

The entire disclosures of Patent Literatures and Non-Patent Literatures quoted above are hereby incorporated by reference into this disclosure. The exemplary embodiments and the examples may be changed and adjusted in the scope of the entire disclosure (including claims) of the present invention and based on the basic technological concept. Within the scope of the claims of the present invention, various disclosed elements may be combined and selected in a variety of ways.

REFERENCE SIGNS LIST

10 Forwarding node
11 Forward processing unit
12 Control device communication unit
13 Processing rule management unit
14 Processing rule storage unit
15 Packet buffer
16 Synchronization confirmation information storage unit
17 Synchronization confirmation information calculation unit
20 Control device
21 Node communication unit
22 Control message processing unit
23 Topology management unit
24 Path/action calculation unit
25 Processing rule management unit
25a Comparison unit
25b Confirmation unit
26 Synchronization confirmation information storage unit
27 Synchronization confirmation information calculation unit
28 Processing rule storage unit
111 Processing rule search unit
112 Action execution unit
221 Message analysis/processing unit
222 Message generation unit

What is claimed is:

1. A communication system, comprising:
a control device that determines packet processing rules for a plurality of forwarding nodes;
said forwarding nodes, that process a received packet using a processing rule that comprises one of a plurality of processing rules transmitted from said control device and that corresponds to the received packet;
a comparison unit that compares a first value with a second value, the first value calculated from a first processing rule group held in one forwarding node among said forwarding nodes, the second value calculated from a second processing rule group determined by said control device for transmission to said forwarding node; and
a confirmation unit that confirms if said forwarding node and said control device are synchronized, based on a comparison result,
wherein, if a mismatch between the first value and the second value is detected, said confirmation unit compares a third value with a fourth value to detect an out-of-synchronization position, the third value calculated from a first part selected from the first processing rule group, the fourth value calculated from a second part of the second processing rule group corresponding to the first part, and
wherein at least one of said control device and said forwarding node manages a plurality of generations by assigning generation management information to the first to fourth values according to a predetermined rule.

2. The communication system as defined by claim 1, wherein, based on a result of a comparison between the first value and the second value, said confirmation unit detects whether or not said forwarding nodes and said control device are out of synchronization.

3. The communication system as defined by claim 1, wherein the first value and the second value are configured to be calculated using the third value and the fourth value respectively.

4. The communication system as defined by claim 1, wherein the first part and the second part comprise parts each selected from a table that stores the processing rules.

5. The communication system as defined by claim 4, wherein, when a processing rule is set, said control device notifies said forwarding node about a position in the table in which the processing rule is to be stored, and
wherein, after the processing rule is set, said forwarding node recalculates the first value or the third value and the first value, respectively.

6. The communication system as defined by claim 1, wherein, if the first value and the second value do not match or if the third value and the fourth value do not match, said confirmation unit compares processing rules included in the processing rule groups in which the mismatch was detected.

7. The communication system as defined by claim 1,
wherein said comparison unit compares the first/third values with the second/fourth values that have matching generation management information.

8. A control device, comprising:
a first unit that determines packet processing rules for a plurality of forwarding nodes;
a second unit that transmits the determined processing rules to said forwarding nodes that process a received packet according to processing rules that comprise one of a plurality of processing rules and that corresponds to the received packet; and
a third unit that calculates a second value from a second processing rule group determined for transmission to said forwarding nodes in order to confirm synchronization with said forwarding node by comparison with a first value calculated from a first processing rule group held in one forwarding node among said forwarding nodes,
wherein, if a mismatch between the first value and the second value is detected, said third unit compares a third value with a fourth value to detect an out-of-synchronization position, the third value calculated from a first part selected from the first processing rule group, the fourth value calculated from a second part of the second processing rule group corresponding to the first part, and wherein at least one of said first unit and said forwarding node manages a plurality of generations by assigning generation management information to the first to fourth values according to a predetermined rule.

9. The control device as defined by claim 8, wherein, based on a result of the comparison between the first value and the second value, said third unit detects whether or not said forwarding nodes and said control device are out of synchronization.

10. The control device as defined by claim 8, wherein the first value and the second value are configured to be calculated using the third value and the fourth value respectively.

11. The control device as defined by claim 8, wherein the first part and the second part are parts each selected from a table that stores the processing rules.

12. The control device as defined by claim 11, wherein, when a processing rule is set, said control device notifies said forwarding node about a position in the table in which the processing rule is to be stored, and wherein, after the processing rule is set, said forwarding node recalculates the first value or the third value and the first value respectively.

13. The control device as defined by claim 8, wherein, if the first value and the second value do not match or if the third value and the fourth value do not match, said confirmation unit compares processing rules included in the processing rule groups in which the mismatch was detected.

14. The control device as defined by claim 8, wherein said control device manages a plurality of generations by assigning generation management information to first to fourth values according to a predetermined rule, and wherein said third unit compares the first/third values with the second/fourth values that have matching generation management information.

15. A plurality of forwarding nodes, comprising:

a first unit that processes a received packet according to a processing rule that comprises one of a plurality of processing rules for the plurality of forwarding nodes transmitted from a control device and that corresponds to the received packet; and a second unit that calculates a first value from a first processing rule group held in one forwarding node among the forwarding nodes in order to confirm synchronization between said control device and said forwarding nodes by comparison with a second value calculated from a second processing rule group determined by said control device for transmission to said forwarding node, wherein, if a mismatch between the first value and the second value is detected, a third unit compares a third value with a fourth value to detect an out-of-synchronization position, the third value calculated from a first part selected from the first processing rule group, the fourth value calculated from a second part of the second processing rule group corresponding to the first part, and wherein at least one of said control device and said forwarding node manages a plurality of generations by assigning generation management information to the first to fourth values according to a predetermined rule.

16. A communication control method that controls a communication system comprising a control device that determines packet processing rules for a plurality of forwarding nodes, in which said forwarding nodes process a received packet using a processing rule that comprises one of a plurality of processing rules transmitted from said control device and that corresponds to the received packet, said communication control method comprising:

comparing a first value with a second value, the first value calculated from a first processing rule group held in one forwarding node among said forwarding nodes, the second value calculated from a second processing rule group determined by said control device for transmission to said forwarding node; and confirming if said forwarding node and said control device are synchronized based on a comparison result, wherein, if a mismatch between the first value and the second value is detected, a third value is compared with a fourth value to detect an out-of-synchronization position, the third value calculated from a first part selected from the first processing rule group, the fourth value calculated from a second part of the second processing rule group corresponding to the first part, and wherein at least one of said control device and said forwarding node manages a plurality of generations by assigning generation management information to the first to fourth values according to a predetermined rule.

17. A computer-readable storage medium storing a program that causes a computer connected to a communication system, which comprises a control device that determines packet processing rules for a plurality of forwarding nodes, in which said forwarding nodes process a received packet using a processing rule that comprises one of a plurality of processing rules transmitted from said control device and that corresponds to the received packet, to perform:

comparing a first value with a second value, the first value calculated from a first processing rule group held in one forwarding node among said forwarding nodes, the second value calculated from a second processing rule group determined by said control device for transmission to said forwarding node; and confirming if said forwarding node and said control device are synchronized based on a comparison result, wherein, if a mismatch between the first value and the second value is detected, a third value is compared with a fourth value to detect an out-of-synchronization position, the third value calculated from a first part selected from the first processing rule group, the fourth value calculated from a second part of the second processing rule group corresponding to the first part, and wherein at least one of said control device and said forwarding node manages a plurality of generations by assigning generation management information to the first to fourth values according to a predetermined rule.

* * * * *